Patented Apr. 3, 1945

2,372,786

UNITED STATES PATENT OFFICE 2,372,786

HIGH SO₃ AMIDE PRODUCTS

Maurice J. Kelley, Philadelphia, Pa., and William L. Abramowitz, Lakewood, N. J., assignors to National Oil Products Company, Harrison, N. J., a corporation of New Jersey No Drawing. Application January 30, 1942, Serial No. 428,878

20 Claims. (Cl. 260—401)

This invention relates to sulfonated fatty amide products, and more particularly to fatty amide products characterized by a high SO₃ content.

It has heretofore been proposed to react high SO₃ sulfonated fatty materials with amino compounds to provide amidified and saponified products having the properties of ready solubility in other oils and of forming stable emulsions in aqueous media. Such products consist of mixtures of amides and amine soaps of sulfonated fatty acids, the proportion of the amides and soaps varying with the conditions of manufacture. In general, more drastic and prolonged reaction of the amine and sulfonated fatty material will lead to a higher proportion of amides in the product. While it is very desirable to have a high proportion of amides in the product, in practice it has been found inadvisable to carry the reaction beyond the formation of more than about 50% amides, for the reason that the sulfonated fatty material undergoes decomposition during the reaction and a prolonged treatment will result in an excessive loss of SO₃. This difficulty somewhat limits the application of the resulting products, since their solubility and stability, especially in acid media, are thereby reduced.

Accordingly, it is an object of this invention to produce sulfonated amide products which will consist substantially entirely of amides while retaining substantially undiminished the SO₃ content of the sulfonated fatty material from which they are made.

It is a further object to produce sulfonated amide products which will have higher solubilities than the products heretofore made.

A further object is to produce sulfonated amide products which will be more stable in acid solutions than the products heretofore made.

A still further object is to reduce the reaction time required in the manufacture of sulfonated amides.

The above and other objects are secured in accordance with this invention by the introduction of a nitrogenous catalyst into the reaction mixture during the manufacture of sulfonated amides. Such a catalyst accelerates the reaction so that the amidification can be carried out substantially to completion before appreciable loss of SO₃ has taken place. The resulting product will therefore consist substantially entirely of amides that will not have undergone any diminution in SO₃ content and will accordingly possess greater solubility and stability than the mixed saponified and amidified products of relatively lower SO₃ content heretofore produced.

With reference to the nitrogenous catalyst above-mentioned, this may be any ammonium or amine salt such as, for example, ammonium chloride; hydrochlorides of primary amines such as methylamine, ethylamine, propylamine, ethanolamine and aniline; or of secondary amines such as dimethylamine, diethylamine, dipropylamine, methyl ethylamine, and diisopropylamine; or of tertiary amines such as triethylamine and triethanolamine; or of tertiary organic nitrogen compounds such as pyridine. The hydrochloride salts of the above amino compounds are cited as suitable catalysts; however, any other mineral acid salts of these compounds could be used, as, for example, the sulfates, nitrates or phosphates. In cases where the catalyst chosen is the salt of an amine which is to enter into the reaction, the catalyst may be generated in situ by the addition of an appropriate mineral acid, and of an excess quantity of the amine.

The reaction is carried out by mixing the sulfonated fatty material, the amine and the nitrogenous catalyst, and heating the mixture for a sufficient time, usually between ½ and 2 hours, to complete the amidification reaction without causing any substantial loss in SO₃ from the sulfonated product. The temperature should be sufficiently high to bring about amidification and must be below the decomposition or boiling temperatures of the reactants at the pressure under which the reaction is carried out. Usually the lowest temperature at which amidification will occur will be about 100° C., and in general the reactions will be carried out between this temperature and about 250° C. In the case where secondary or tertiary amides are used as the amino constituents in the reaction, it will be necessary to operate at even higher temperatures.

Sulfonated fatty materials for use as starting materials in this invention may suitably be any high SO₃ sulfonated fatty material such as, for example, the sulfonated oils, fats, fatty acids and fatty esters. For instance, there may be employed high SO₃ sulfonated oils produced from vegetable sources such as castor oil, corn oil, cottonseed oil, olive oil, palm oil, andiroba oil, peanut oil, sunflower oil, rice bran oil, rapeseed oil, mustardseed oil, teaseed oil, chaulmoogra oil, tomato seed oil, sesame oil, soyabean oil, cocoa butter, Chinese tallow, etc.; the high SO₃ sulfonated animal oils and fats derived from materials such as neat's-foot oil, beef tallow, bone fat, horse fat, wool fat, mutton tallow, etc.; the high $SO_3$ sulfonated marine oils derived from materials such as cod liver oil, cod oil, herring oil, menhaden oil, porpoise oil, seal oil, salmon oil, sardine oil, shark liver oil, sperm oil, whale oil, tuna body oil, etc.; and the high $SO_3$ sulfonated fatty acids and fatty acid esters derived from the above-mentioned oils and fats. It is also within the purview of the invention to include the treatment of sulfonated mono- and diglycerides of higher fatty acids, and the sulfonated blown or hydroxylated derivatives of fats or fatty acids. The sulfonated starting materials may contain any of the usual percentages of combined $SO_3$ found in technical products of this sort. However, the features of this invention whereby loss of $SO_3$ is avoided are particularly advantageous in the treatment of materials containing relatively high percentages of $SO_3$ on the order of about 5% to about 20% combined $SO_3$.

The process of this invention is particularly applicable to the treatment of high $SO_3$ sulfonated oils, fats, fatty acids and fatty esters containing less than about 3% of water and about 0.2% inorganic salts, such as are prepared in accordance with the applications of Steik, Serial No. 279,678, filed June 17, 1939, now Patent No. 2,328,931, granted September 7, 1943, or of Kapp, et al., Serial No. 197,858, filed March 24, 1938, which issued on June 2, 1942 as Patent No. 2,285,337. Amide products made from these substantially water- and salt-free sulfonated materials by the process of this invention are readily soluble in oils of substantially all types, form very stable emulsions in aqueous media and are highly resistant to deterioration in storage. The combination of the several unique features in these products—high $SO_3$ content, high ratio of amides to soaps, and low salt and water content—adapt the products to many novel uses, such as incorporation into viscose spinning baths, and result in superior performance in older applications for products of this general type.

Amines suitable for use as starting materials in the manufacture of products by the process of this invention may be any amines capable of reacting to form amides with the sulfonated fatty material employed; for example, monoethanolamine, diethanolamine, monopropanol amine, dipropanol amine, hydroxy ethyl ethylene diamine, diethylene triamine, triethylene tetramine, tetraethylene pentamine, monoamyl amine, octadecyl amine, morpholine, triethanolamine and aniline, may be used. Other suitable compounds include diamino isopropanol, ethyl ethanolamine, butyl ethanolamine, ethylene diamine and the various hydroxy-amines produced by reduction of nitro alcohols derived from aliphatic nitro hydrocarbons.

Sulfonated amide products prepared as above outlined consist largely of amides and contain high percentages of combined $SO_3$. As a result, the products are highly soluble in aqueous media and show particularly good solubility, in comparison with earlier products, in acid media. For example, one of the products made by the reaction between sulfonated oleic acid and tetraethylene pentamine was clearly soluble in the strongly acid medium used for viscose spinning baths, and on that account has found extensive application as an additive to such baths for the prevention of clogging of the spinnerettes in rayon manufacture. Further, solutions of these products in acid media exhibit a very low surface tension, which points to the use of these materials in textile treating baths, such as wool carbonizing baths and acid dyeing baths.

With the above discussion in mind, the following examples are given of procedures according to this invention, which examples are to be taken as illustrative merely and not in any limiting sense. All parts are given by weight.

Example I

A sulfonated oleic acid was prepared in accordance with the process described in the application of Kapp, et al., Serial No. 197,858 which issued on June 2, 1942, as Patent No. 2,285,337, which sulfonated oleic acid contained 16% $SO_3$ less than 3% water and less than 0.2% organic salts. 200 parts of this sulfonated material were mixed with 50 parts of monoethanolamine, and 10 parts of ammonium chloride were added. The mixture was then heated with stirring at 165° C. for one hour. Thereafter the mixture was cooled and constituted a brown, viscous liquid product in which 94% of the reactants occurred as amides. This product was clearly soluble in water and produced foaming.

Example II 200 parts of the same sulfonated oleic acid as was employed in Example I, 83 parts of ethanol ethylene diamine and 10 parts of ammonium chloride were mixed, and the mixture condensed at 165° C. for 1½ hours. The product when cooled was a light brown, clearly water-soluble, soft, sticky solid. All of the sulfonated oleic acid was converted to the amide.

Example III 200 parts of the sulfonated oleic acid used in Example I, 152 parts of tetraethylene pentamine and 10 parts of ammonium chloride were mixed and the mixture condensed at 165° C. for one hour. The product was an amber-colored, viscous, water-soluble liquid. The sulfonated oleic acid was completely converted to the amide. This product dissolved clearly in a viscose spinning bath of the following formula:

| | Per cent |
|---|---|
| $H_2SO_4$ | 10 |
| $Na_2SO_4$ | 18 |
| $ZnSO_4$ | 1 |
| Water | 71 | and in this bath served to prevent clogging of the viscose spinnerette in connection with which the bath was used.

Example IV 55 parts of a sulfonated red oil containing 9% combined $SO_3$, 2% of moisture and less than 0.2% of inorganic salts were mixed with 42 parts of tetraethylene pentamine and 3% of pyridine hydrochloride. The mixture was heated to 165° C. for 1½ hours, and then cooled. The resultant product was a hard, brown colored, sticky solid readily soluble in hot water.

Example V

The procedure of Example IV was repeated using trimethyl amine hydrochloride in place of the pyridine hydrochloride. The resultant product was a hard, sticky, clear, brown-colored solid readily soluble in water.

From the above discussion and examples, it will be seen that there is provided by this invention a process for obtaining sulfonated amide products containing both higher percentages of amides and of combined $SO_3$ than any products heretofore produced. These products are further characterized by low percentages of moisture and inorganic salt content in those cases in which the sulfonated fatty material employed contained low percentages of moisture and salt. These properties render the products resistant to deterioration in storage, and readily and stably miscible in other oils and in aqueous media. The sulfonated amides produced in accordance with this invention stand out especially over earlier products in their higher solubilities in acid media. This last advantage renders these products applicable in highly acid media, as for instance in viscose spinning baths, to prevent clogging of spinnerettes or as penetrants in acid textile treating media such as wool-carbonizing baths and the like. The greater solubility and stability of the new products also make them more desirable for use in the same application in which earlier products of this nature have been employed, viz. as textile softeners, wetting, dispersing and emulsifying agents, plasticizers, detergents, pour point depressors in fuels and lubricants, penetrants in leather and paper treatment, demulsifying agents for crude oil emulsions, blending and dewaxing agents in petroleum refining, for removing spray residues and as latex stabilizers. They may be incorporated in adhesive compositions, cosmetics, compositions for fat-liquoring and oiling leather, lubricants, cutting oils, wire drawing compounds, and polishes.

Having described our invention what we claim as new and desire to secure by Letters Patent is:

1. A process for producing sulfonated fatty amide products which comprises heating a substance selected from the group consisting of animal and vegetable sulfonated oils, fats, higher fatty acids and higher fatty esters, with an amide-forming amine in the presence of a substance chosen from the group consisting of ammonium and amine salts of mineral acids as a catalyst.

2. A process for producing sulfonated fatty amide products which comprises heating a substance selected from the group consisting of animal and vegetable sulfonated oils, fats, higher fatty acids and higher fatty esters containing between about 5% and about 20% combined $SO_3$, with an amide-forming amine in the presence of a substance chosen from the group consisting of ammonium and amine salts of mineral acids as a catalyst.

3. A process for producing sulfonated fatty amide products which comprises heating a substance selected from the group consisting of animal and vegetable sulfonated oils, fats, higher fatty acids and higher fatty esters, with an amide-forming amine in the presence of a substance chosen from the group consisting of ammonium and amine salts of mineral acids as a catalyst for between about ½ and 1½ hours and at temperatures between about 100° and about 250° C.

4. A process for producing sulfonated fatty amide products which comprises heating a substance selected from the group consisting of animal and vegetable sulfonated oils, fats, higher fatty acids and higher fatty esters containing between about 5% and about 20% combined $SO_3$, with an amide-forming amine in the presence of a substance chosen from the group consisting of ammonium and amine salts of mineral acids as a catalyst for between about ½ and 1½ hours and at temperatures between about 100° and 250° C.

5. A process for producing sulfonated fatty amide products which comprises heating a sulfonated higher fatty acid with an amide-forming amine in the presence of a substance chosen from the group consisting of ammonium and amine salts of mineral acids as a catalyst.

6. A process for producing sulfonated fatty amide products which comprises heating sulfonated oleic acid with an amide-forming amine in the presence of a substance chosen from the group consisting of ammonium and amine salts of mineral acids as a catalyst.

7. A process for producing sulfonated fatty amide products which comprises heating a substance selected from the group consisting of animal and vegetable sulfonated oils, fats, higher fatty acids and higher fatty esters, with an amide-forming polyamine in the presence of a substance chosen from the group consisting of ammonium and amine salts of mineral acids as a catalyst.

8. A process for producing sulfonated fatty amide products which comprises heating a substance selected from the group consisting of animal and vegetable sulfonated oils, fats, higher fatty acids and higher fatty esters containing between about 5% and about 20% combined $SO_3$, with an amide-forming polyamine in the presence of a substance chosen from the group consisting of ammonium and amine salts of mineral acids as a catalyst.

9. A process for producing sulfonated fatty amide products which comprises heating a sulfonated higher fatty acid with an amide-forming polyamine in the presence of a substance chosen from the group consisting of ammonium and amine salts of mineral acids as a catalyst.

10. A process for producing sulfonated fatty amide products which comprises heating sulfonated oleic acid with an amide-forming polyamine in the presence of a substance chosen from the group consisting of ammonium and amine salts of mineral acids as a catalyst.

11. A process for producing sulfonated fatty amide products which comprises heating a substance selected from the group consisting of animal and vegetable sulfonated oils, fats, higher fatty acids and higher fatty esters, with tetraethylene pentamine in the presence of a substance chosen from the group consisting of ammonium and amine salts of mineral acids as a catalyst.

12. A process for producing sulfonated fatty amide products which comprises heating a substance selected from the group consisting of animal and vegetable sulfonated oils, fats, higher fatty acids and higher fatty esters containing between about 5% and about 20% combined $SO_3$, with tetraethylene pentamine in the presence of a substance chosen from the group consisting of ammonium and amine salts of mineral acids as a catalyst.

13. A process for producing sulfonated fatty amide products which comprises heating a sulfonated higher fatty acid with tetraethylene pentamine in the presence of a substance chosen from the group consisting of ammonium and amine salts of mineral acids as a catalyst.

14. A process for producing sulfonated fatty amide products which comprises heating sulfonated oleic acid with tetraethylene pentamine in the presence of a substance chosen from the group consisting of ammonium and amine salts of mineral acids as a catalyst.

15. A process for producing sulfonated fatty amide products which comprises heating a substance selected from the group consisting of animal and vegetable sulfonated oils, fats, higher fatty acids and higher fatty esters containing less than about 3% water and less than about 0.2% inorganic salts, with an amide-forming amine in the presence of a substance chosen from the group consisting of ammonium and amine salts of mineral acids as a catalyst.

16. A process for producing sulfonated fatty amide products which comprises heating a substance selected from the group consisting of animal and vegetable sulfonated oils, fats, higher fatty acids and higher fatty esters containing between about 5% and about 20% combined $SO_3$, less than about 3% water and less than about 0.2% inorganic salts, with an amide-forming amine in the presence of a substance chosen from the group consisting of ammonium and amine salts of mineral acids as a catalyst.

17. A process for producing sulfonated fatty amide products which comprises heating a sulfonated higher fatty acid containing less than about 3% water and less than about 0.2% inorganic salts with an amide-forming amine in the presence of a substance chosen from the group consisting of ammonium and amine salts of mineral acids as a catalyst.

18. A process for producing sulfonated fatty amide products which comprises heating a sulfonated oleic acid containing less than about 3% water and less than about 0.2% inorganic salts with an amide-forming amine in the presence of a substance chosen from the group consisting of ammonium and amine salts of mineral acids as a catalyst.

19. A process for producing sulfonated fatty amide products which comprises heating a substance selected from the group consisting of animal and vegetable sulfonated oils, fats, higher fatty acids and higher fatty esters, with an ethanolamine in the presence of a substance chosen from the group consisting of ammonium and amine salts of mineral acids as a catalyst for between about ½ and 1½ hours and at temperatures between about 100° and about 250° C.

20. A process for producing sulfonated fatty amide products which comprises heating a substance selected from the group consisting of animal and vegetable sulfonated oils, fats, higher fatty acids and higher fatty esters containing between about 5% and about 20% combined $SO_3$, less than about 3% water and less than about 0.2% inorganic salts, with ethanol ethylene diamine in the presence of a substance chosen from the group consisting of ammonium and amine salts of mineral acids as a catalyst for between about ½ and 1½ hours and at temperatures between about 100° and about 250° C.

MAURICE J. KELLEY.
WILLIAM L. ABRAMOWITZ.